Feb. 25, 1930.　　T. R. THOMAS　　1,748,924
STEERING KNUCKLE LUBRICATION
Original Filed Sept. 28, 1925　　3 Sheets-Sheet 1
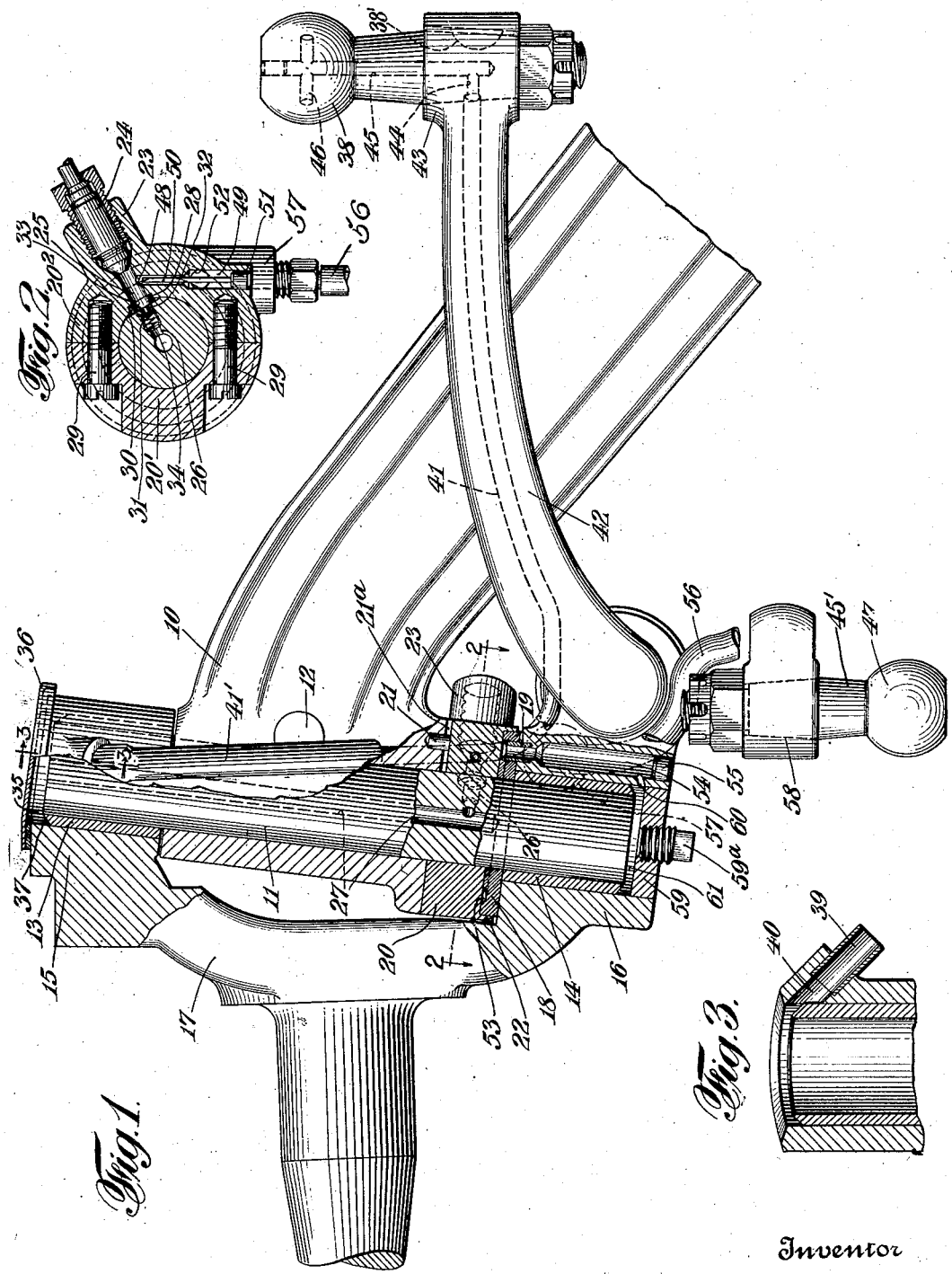
Inventor
Thomas R. Thomas
By his Attorneys
Dean, Fairbank, Obright & Hirsch

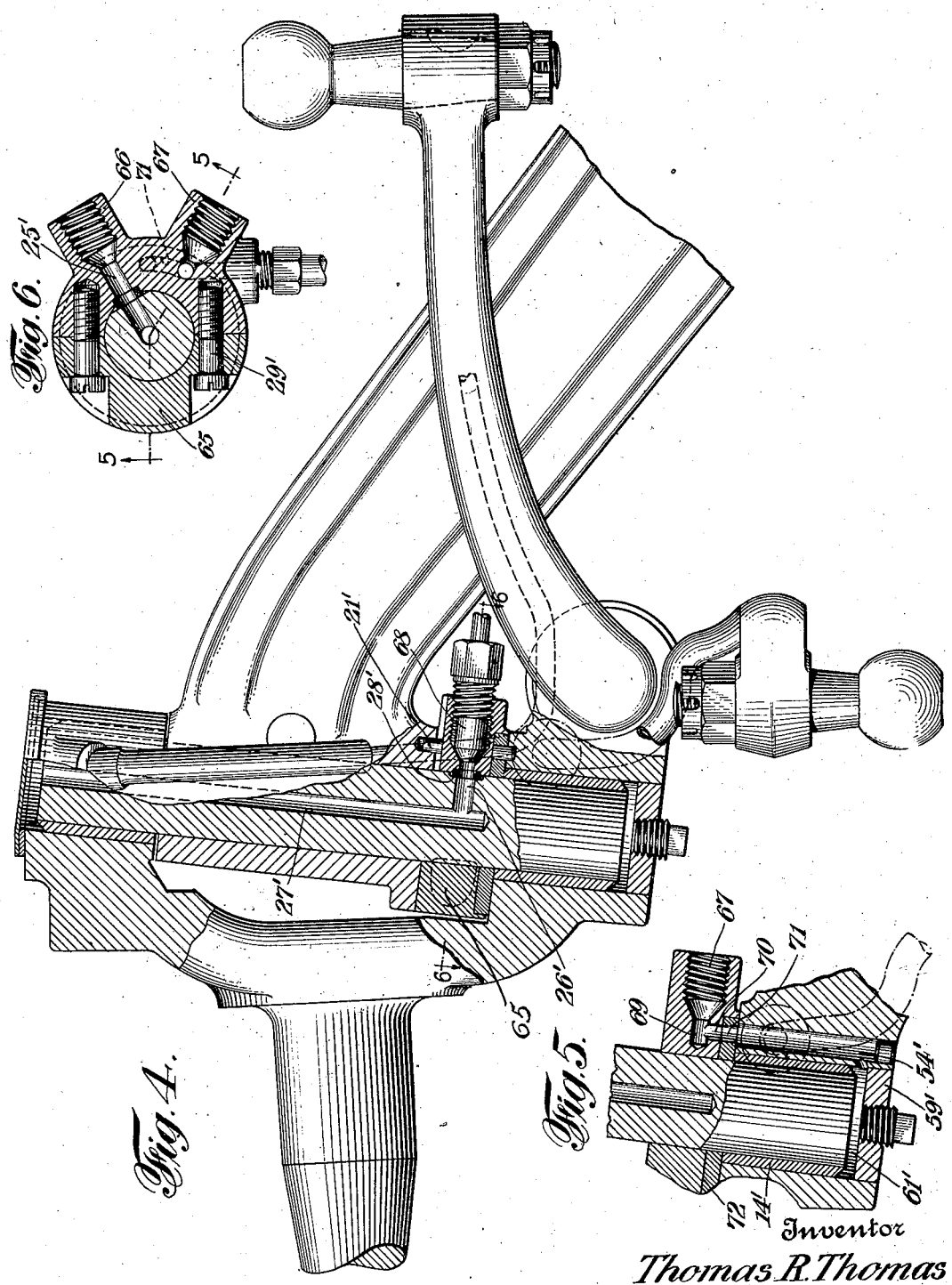

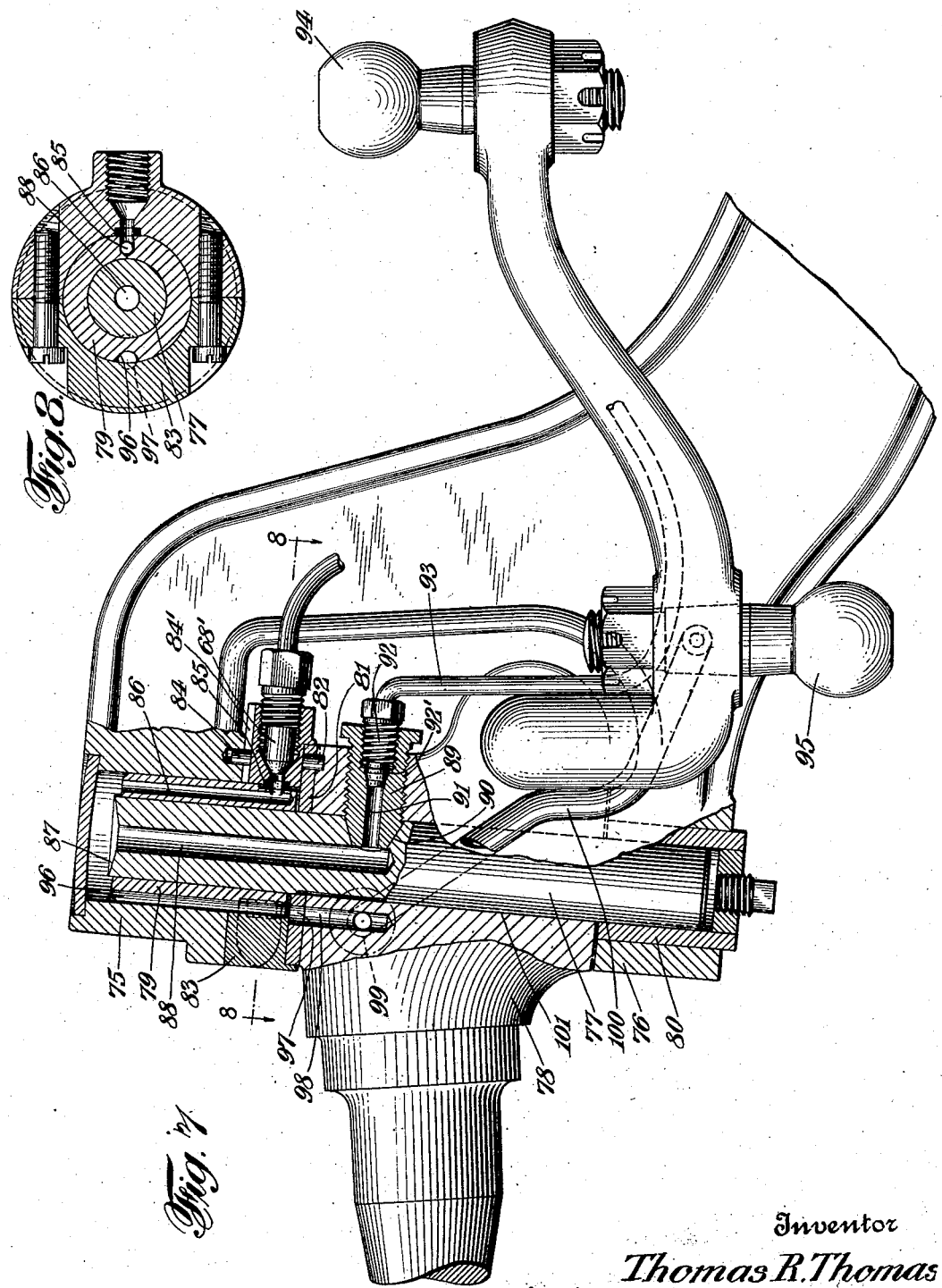

Patented Feb. 25, 1930

1,748,924

UNITED STATES PATENT OFFICE

THOMAS R. THOMAS, OF NEWARK, NEW JERSEY, ASSIGNOR TO AUTO RESEARCH CORPORATION, A CORPORATION OF DELAWARE

STEERING-KNUCKLE LUBRICATION

Application filed September 28, 1925, Serial No. 59,002. Renewed April 29, 1929.

My present invention is concerned with gravity flow systems of the general type described in the British patent to Joseph Bijur, No. 254,655, and in common with said British patent has a preferred application in association with pressure lubricating systems, more particularly for delivering lubricant by gravity flow from a pressure line to the bearing or bearings of a structure having a swiveled or other movable connection to the structure carrying the pressure line, and especially where it is undesirable to convey the lubricant under pressure past or across such swivel or other connection.

The invention has a preferred application to the lubrication of the steering knuckles of a motor vehicle and in common with that of said British patent, the broad object of delivering lubricant reliably to various knuckle bearings, and without the need for selective manipulation, nor the use of auxiliary swivels or of flapping conduits or other parts likely to become damaged in use, or the entry of dust to the bearing surfaces.

Among the more specific objects of the invention are to apply a lubricating installation of the character set forth to an axle and knuckle construction, differing from types theretofore in common use, substantially only in added machining operations, such as providing bores in the standard parts thereof, so that dies already in use for forging such axles and knuckles can be used further without substantial modification thereof for production of axles lubricated according to the invention.

The objects are attained broadly by an arrangement in which the lubricant inlet for the knuckle is fixed neither directly into the axle nor into the knuckle, but disposed adjacent the king pin or other knuckle pivot axis on a suitable sustaining member therefor lodged in a space between the knuckle and the axle and keyed to the latter.

In a preferred embodiment of the invention, I substitute for the usual knuckle thrust bearing, one of the same contour, comprising a thrust disk on the knuckle and a thrust block of greater thickness rigid with the axle. The lubricant from the axle is admitted through the thrust block fixed thereto, whence it passes to the knuckle bearings. In one embodiment, the lubricant admitted through the thrust block is delivered upward through a corresponding passage carried as a rigid part of the axle to the upper end of the knuckle, whence the lubricant flows by gravity downward along the structure of the knuckle through corresponding conduits to the knuckle bearings to be lubricated.

In another embodiment, some of the lubricant from the thrust block is fed downward preferably through the thrust disk to the knuckle construction for lubricating the lowermost bearing or bearings carried on the knuckle. The lubricant inlet may be a single drip plug or inlet fitting for supplying lubricant to all of the bearings or two or more such drip plugs may be provided in the thrust block, each conveying lubricant through separate and distinct conduits to different bearings of the knuckle.

In the accompanying drawings in which are shown one or more of various possible embodiments of the several features of the invention, Fig. 1 is a side view partly in section of one embodiment of lubricated knuckle, Fig. 2 is a transverse sectional view taken along the line 2—2 of Fig. 1, Fig. 3 is a sectional view taken along the line 3—3 of Fig. 1, Fig. 4 is a view similar to Fig. 1 of another embodiment, Fig. 5 is a fragmentary sectional detail view of the lower end of Fig. 4, taken along the line 5—5 of Fig. 6, Fig. 6 is a sectional view taken along the line 6—6 of Fig. 4, Fig. 7 is a view similar to Fig. 1 of another embodiment, and;

Fig. 8 is a transverse sectional view taken along the line 8—8 of Fig. 7.

Referring now to Figs. 1 to 3 of the drawings, I have shown an axle beam 10, through the eye of which extends a king pin 11 secured thereto by cross key 12 and bearing at its ends in bushings 13 and 14 in clevis jaws 15 and 16 respectively of the knuckle 17. Clevis jaw 16 is closed at its lower end by a plug 59 below the lower end of the king pin, said plug having a screw plug 59ª therein removable to permit access to the lower end of the king pin for pushing out the latter.

In the conventional construction thus far described, the eye of the beam is of a length substantially less than the distance between the clevis jaws of the knuckle to provide space for a thrust bearing interposed between the lower clevis jaw and the lower end of the eye of the axle beam.

In the present embodiment, I have substituted for the usual ball thrust bearing, a thrust bearing construction of corresponding external configuration, but of the plate type which comprises a disk 18 resting on the lower clevis jaw and having a pin 19 fixed therein directed downward into a corresponding opening in the clevis jaw to maintain the disk from rocking therewith and made hollow for a purpose which will appear hereinafter. Upon the disk is a thrust block 20 of greater thickness, provided with a radial groove 21ª in the upper face thereof, into which extends a pin 21 press-fitted into a corresponding depression in the lower face of the axle beam and serving to key the thrust-block to the axle beam. The thrust disk and the thrust block determine a thrust bearing surface therebetween from which dust is effectively excluded by an integral skirt 22 on the block, snugly encircling a substantial part of the thickness of the disk 18.

The thrust block is here employed also for admission of lubricant to the bearings, preferably from a centralized lubricating system on the motor vehicle, which simultaneously serves a multiplicity of chassis bearings thereon. For this purpose, I have shown the thrust block provided with a unitary lateral extension socket 23 thereon protruding toward the axle beam. An appropriate inlet fitting such as a drip plug 24 of the type shown in the copending application of Edward H. Kocher, Serial No. 22,104, filed April 10th, 1925, may be provided in the socket and fed from the central source of pressure. The socket communicates with a port 25 radially through the thrust block aligned with and delivering into a radial bore 26 in the king pin, the latter bore communicating with an axial bore 27 from the top of the king pin to below said radial bore.

To maintain a lubricant-tight joint between the thrust block and the king pin, so that lubricant passed from the inlet fitting will flow without loss into the king pin, I provide the construction best shown in Fig. 2. A small annular gasket 28 is disposed in a countersink in the inner end of the bore 25 in the thrust block and said thrust block is split into the two segments 20′ and 20² tightly clamped together by screws 29 to cause said segments to firmly grip the king pin and thereby to tightly compress the gasket into the socket and against the king pin. For more effective tightness, the king pin is flattened as at 30 in the region of the gasket, which is thus not distorted out of its plane but merely compressed in the assembly. The gasket will, accordingly, be effectively compressed without injury thereto, a result that could be accomplished only with difficulty, if at all, were the gasket placed in a unitary thrust block and the king pin driven therethrough for friction fit.

In the radial bore 26 of the king pin, there is placed a check valve assembly comprising a cartridge 31 having a seat 32 near the outer face of the king pin and an appropriate disk valve 33 normally urged thereagainst by a coil spring 34 housed therein.

Lubricant that has passed the upper end of the king pin bore spreads in the cavity 35 thereabove, which is sealed by the cap 36 on the knuckle and such lubricant will in part seep between the king pin and the bushing 13 to lubricate that bearing, the rest passing about the beveled upper edge 37 of the bushing for transmission to the drag link bearing 38. For this purpose, a short tube 39 is friction-fitted into an oblique bore 40 in the upper knuckle clevis and a pipe 41 friction-fitted over the protruding end of said tube extends downward therefrom to and along the drag link arm 42 to the eye 43 of the corresponding bearing, from which the lubricant passes on by way of radial bore 44 and longitudinal bore 45 in the ball stud thereof for emission at radial bores 46 of the ball thereof to the corresponding bearing. Key 38′ positions the ball stud 38 to maintain bore 44 aligned with pipe 41. As in the disclosure of the prior British patent of Bijur above referred to, the internal diameter of the pipe 41 down to at least the level of the ball outlet, is sufficiently large as appears at 41′, to permit passage of lubricant about any air therein, thereby precluding air blocking, the conduit below said level in which lubricant becomes trapped since it extends below the outlet 46 being, if desired, of smaller diameter, as shown.

The tie rod bearing 47 and the lower king pin bearing 14 are also supplied with lubricant from the inlet fitting 24. For this purpose, a bore 48 along a chord of the circular thrust block intersects the radial bore 25, said bore being of larger diameter as at 49 at its outer end, and of reduced diameter at its inner end. A restriction pin 50 preferably extends into bore 48, affording a clearance that will reasonably limit the flow of lubricant therethrough, and thus assure reasonable division, said pin being maintained in place in the bore by a plug 51 friction-fitted into the outer end of the larger bore 49 and closing said outer end.

The enlarged bore 49 communicates through a bore 52 therebelow with the thrust bearing surface between the block 20 and the disk 18, lubricant through said latter bore being intercepted by an annular groove 53 at the thrust bearing face of the disk 18, from which some oil will spread to lubricate said thrust face. The pin 19 that retains the disk 18 fast with the knuckle, is a short tube as shown, so as to deliver lubricant from the annular groove 53 into a longitudinal bore 54 in the lower clevis jaw of the knuckle, which is plugged at its lower end at 55. A pipe 56 is secured by an appropriate terminal 57 to the knuckle, said pipe extending generally along the structure of the knuckle or along the tie rod arm and delivering to the taper-fitted surface 58 of the tie rod ball stud 47 which may be provided with a system of bores (not shown) similar to that of the drag link bearing. Immediately above the plug 59 a small port 60 is bored to establish communication between the bore 54 and the small well 61 between the lower end of the king pin and the plug 59.

In operation, when pressure is applied at the source (not shown) lubricant admitted to the control fitting 24 will divide in a substantially predetermined ratio, part passing through the restricted outlet determined by pin 50, the latter offering sufficient resistance to maintain a residual pressure effective to crack the check valve 33 off its seat and admit some of the lubricant into the longitudinal king pin bore 27. Lubricant is normally stored in said bore since it cannot return past the check valve 33, so that as lubricant is admitted at the lower end of bore 27, some will overflow from the upper end thereof, which will flow in part between the king pin and the bushing 13 to lubricate the corresponding bearing surface and in part about the beveled end 37 of the bushing 13 to drain into the pipe 41'—41, for supplying the drag link bearing in manner, in part described above and more fully set forth in the aforementioned British patent of Joseph Bijur. Such lubricant as has passed the restricted outlet 50 will flow through port 52 into groove 53, from which some will spread to lubricate the thrust bearing. Lubricant from port 52 will also pass into tube 19 and bore 54, the lubricant from bore 54 passing through port 60 and maintaining a common level in the bore and about the lower end of the king pin. Lubricant at the level of the terminal 57 will overflow therethrough, and through pipe 56 to supply the bearing surface of the tie rod bearing.

In the present embodiment, as in the British patent of Joseph Bijur, the tie rod pipe 56 is of diameter sufficiently large to permit the flow of lubricant about any air therein whereby air-blocking is precluded.

To disassemble the construction, the king pin lock key 12, the screw plug 59 and the cover plate 36 are removed, the vehicle being supported on a jack. Screws 29 are now either loosened or removed, so that the split bushing 20 will relieve pressure on the king pin, which may now be driven out of place. The knuckle 17 can then be slipped off the axle, in which operation the thrust bearing 18—20 is carried as a unit with it, since the tube 19 anchors the disk 18 to the knuckle. The skirt 22 prevents lateral separation of block 20 from disk 18, and the notch 21 permits free movement of block 20 past pin 21. The thrust bearing can then be readily separated into its constituent parts. For assembly, the order of steps set forth is reversed.

In Figs. 4, 5 and 6 is shown an embodiment having many features of similarity with that just described, and differing largely in that the thrust block 65 is provided with two integral nipples 66 and 67, each of which serves for mounting a flow controlling inlet fitting such as a drip plug, the outline of one of which is shown at 68. The nipple 66 is arranged to supply lubricant to the upper king pin bearing by a construction and arrangement identical with that shown in Fig. 1 and above described, except that in this embodiment, the check valve 33 is omitted. Corresponding parts are indicated by the same reference numerals as in Fig. 1, primed. The inlet fitting in socket 67 supplies lubricant to the thrust bearing, to the lower king pin and to the tie rod bearings. The socket 67 to this end is provided with a cavity 69 of reduced diameter therebeyond, communicating with a vertical bore 70 leading to the thrust face of the thrust block, which, in turn, communicates with a slot 71 in the thrust disk 72, said slot made arcuate so as to register with the bore 70 in all positions of the knuckle. The slot 71 communicates with a bore 54' in the knuckle, from which the lower king pin bearing and the tie rod bearing are supplied in a manner identical with that of Fig. 1, corresponding parts being designated by the same reference numerals primed.

While in the embodiment of Fig. 1, the check valve 33 is provided to preclude draining of the king pin bore through the restriction passage about pin 50, this is eliminated in the embodiment of Figs. 4, 5 and 6, since the lower bearings supplied by the drip plug in socket 67 are entirely free from any communication with the king pin bore 27' and the relief valve provided as a part of each of the drip plug fittings in the sockets 66 and 67 will act as a check valve to prevent such flow return.

In Figs. 7 and 8, is shown another embodiment more particularly used in connection with an Elliott axle, that is, an axle in which the clevis jaws 75 and 76 are a part of the axle beam, and in which the king pin 77 is rigidly secured to the knuckle 78, the ends of the king pin bearing in corresponding bushings 79 and 80, rigidly affixed in the respective axle clevis jaws. I have in this embodiment also shown a construction of substantially conventional design, in which space is afforded for a ball thrust bearing, which I replace by a plate thrust bearing as in the embodiment of Fig. 1, consisting of a disk 81 resting on the knuckle and keyed thereto by a pin 82 in a corresponding depression in the knuckle and a coacting thrust block 83 keyed by a pin 84 fixed in the axle clevis jaw 75 and extending into radial groove 84' in the thrust block, substantially as in the other embodiments. The block is of construction identical with that previously described, but is clamped about the upper bushing 79 which is a rigid part of the axle, rather than about the king pin, which in this construction, pivots with the knuckle. The arrangement of liquid-tight gasket 85 is similar to that previously described, except that it effects a tight joint to a bore 86 longitudinally through the upper bushing, which bushing is made of sufficient thickness to accommodate such bore. The king pin is formed with a trough 87 at its upper end and has a longitudinal bore 88 extending part of the length thereof. The king pin bore delivers lubricant to one of the knuckle control bearings, in this instance, illustratively the drag link. For this purpose, I have illustratively shown a special form of king pin locking key 89, which serves also as a duct for lubricant from the king pin to be admitted to the drag link. The key 89 in this instance, is formed as a plug, threaded into the knuckle, and having a beveled end 90 taper-fitted into a corresponding socket in the king pin. The plug 89 is formed with a longitudinal bore 91 and bushing 92 is threaded into the outer end thereof, for tightening a compression coupling 92' by which a lubricant-tight connection is effected from the plug 89 to a pipe 93 extending downward and along the drag link to the ball pivot stud 94 thereof. To deliver lubricant to the tie rod bearing 95, I have in this instance provided the upper bushing 79 with a longitudinal groove 96 at its outer periphery extending through the entire height thereof, and communicating with a hole 97 in the thrust disk 81, which hole is made arcuate to register with the bushing bore in all positions of steering adjustment of the knuckle. The hole 97 communicates with a short bore 98 aligned therewith, in the knuckle 78, which bore drains through a compression coupling terminal 99 similar to terminal 92—92', into a pipe 100 extending along the knuckle structure and delivering into the tie rod pivot stud 95. The construction of bores through the tie rod and drag link pivot studs are identical with that shown in Fig. 1 and are, therefore, not shown in Fig. 7.

Inasmuch as the king pin locking plug is shown at a level no higher than that of the drag link bearing, the entire length of conduit 93 connected therebetween may be of small diameter, the king pin bore 88 being of relatively large diameter to permit the flow of lubricant therethrough about any air therein, thereby precluding air blocking.

The king pin is preferably provided with a flat 101 along a substantial part of the length thereof through which lubricant can drain from the bushing 79 to lubricate the lower bushing 80.

In operation, lubricant admitted past the drip plug 68' which is rigid with the axle, will rise through bore 86 to the upper end of bushing 79. Some of the lubricant will drain into the trough 87 and through bore 88 into bore 91 in the lock plug 89, thence through conduit 93 to supply the drag link bearing 94. Lubricant will also flow through groove 96 downward along the upper bushing, part escaping through the minute space between the bushing and the disk to spread along the thrust bearing surface, between disk 81 and block 83, and along flat 101 to the bearing of the lower bushing 80, the rest passing through aperture 97 into knuckle bore 98 and thence by way of terminal 99 into pipe 100 to supply the tie rod bearing. The king pin being inclined, as shown, trough 87 is made to protrude above the bushing 79, to assure correctness of division between bore 88 and groove 96, the upper end of said groove being at substantially the same level as the right or lowest part of the outer rim of trough 87. It is found that sufficiently accurate division of lubricant is obtained by the construction described, but if desired, the bores of one or both of the conduit lines 93 and 100 may have restriction pins therein similar to that shown at 50 in Fig. 1, to limit the lubricant delivered therethrough.

The specific subject matter of Figs. 4 to 8 is claimed in a divisional application Serial No. 369,398 filed June 8, 1929.

In all of the embodiments disclosed, it will be noted that the lubricant inlet for the knuckle, is affixed on a sustaining member therefor, disposed adjacent the king pin, lodged in a space between the knuckle and the axle, and keyed to the latter. Preferably the sustaining member serves also as a thrust bearing block, as shown.

In certain of the claims, I use the term "control bearing" as applying to one of the bearings of the knuckle. This term defines generically any of the bearings at the knuckle by which an operating adjustment on the knuckle or the wheel thereon is effected or transmitted from one to the other knuckle.

I claim:—

1. In a motor vehicle, in combination, an axle, a steering knuckle pivoted thereto and an annular member serving as a lubricant inlet and interposed between said knuckle and a part of said axle, and a conduit system carried by said knuckle and supplied from said inlet annulus to convey lubricant to one or more of the knuckle bearings.

2. In a motor vehicle, in combination, an axle, a knuckle having a pivotal mount thereat, a control bearing rigid with said knuckle, a thrust bearing sustaining said axle upon said knuckle, and including a member rigid with the axle, means for supplying lubricant to said control bearing, said means comprising an inlet fitting carried by said thrust bearing member beyond the bearing surface thereof, and a passageway within parts of the structure rigid with the axle, leading upward from the thrust bearing, said knuckle carrying a conduit rigid therewith in flow intercepting relationship with respect to the lubricant transmitted through said passageway, said conduit leading along the structure of the knuckle to said control bearing.

3. In a motor vehicle of the type including an axle and a knuckle, one of said members having a clevis straddling the other, and a king pin affording a bearing with respect to the clevis and rigid with the straddled member, the jaws of said clevis being spaced by a distance greater than the width of the straddled member to afford room for a thrust bearing; the combination therewith of a thrust bearing comprising a pair of coacting members, one rigid with the knuckle and the other rigid with the axle, the latter member having substantial thickness, lubricant inlet means affixed laterally in said latter member, a longitudinal passageway extending from said inlet fitting upward through parts rigid with said axle and a pipe carried by said knuckle and in flow intercepting relationship with respect to lubricant through said passageway, said pipe leading along the structure of the knuckle to a bearing thereof.

4. In a steering axle of the type including a beam, a knuckle coacting with the end thereof, one of said members having a clevis straddling the other, a king pin rigid with the straddled member and affording a bearing surface at the ends thereof for the knuckle member, the clevis jaws being spaced by a distance materially greater than the interposed length of the straddled member, to afford room for a thrust bearing; the combination therewith of a thrust bearing including a bearing block rigid with the axle, said block having an annular lip encircling the thrust bearing face, to render the construction substantially dust-tight, a lubricant inlet fitting affixed to the lateral face of said block, a passageway in structure rigid with said axle terminating near the upper end of the knuckle and a conduit carried by the knuckle leading to one of the bearings thereof, and in flow intercepting relationship with the upper end of said passageway.

5. In a steering axle of the type including a beam, a knuckle coacting with the end thereof, one of said members having a clevis straddling the other, a king pin rigid with the straddled member and affording a bearing surface at the ends thereof for the knuckle member, the clevis jaws being spaced by a distance materially greater than the interposed length of the straddled member, to afford room for a thrust bearing; the combination therewith of a thrust bearing including a plate rigid with the knuckle, a split thrust bearing block, screws drawing the split parts together against a part rigid with the axle, said block having an annular lip encircling the plate to render the bearing face substantially dust-tight, a lubricant inlet fitting affixed in the lateral surface of said block, and having a radial inlet passage for entry of lubricant, and a gasket about the inlet passage and at the inner end thereof, thus compressed against said axle parts, a passageway in structure rigid with said axle communicating with said inlet passage and terminating near the upper end of the knuckle and a conduit carried by the knuckle leading to one of the bearings thereof, and in flow intercepting relationship with the upper end of said passageway.

6. As an article of manufacture, a lubricated thrust bearing for a steering knuckle, said thrust bearing comprising a split cylindrical block having a socket in the lateral surface thereof for a lubricant inlet fitting and having an annular compressible gasket in a corresponding countersink at the inner end of a radial bore therethrough, screws holding the two segments of the block together, an annular skirt at the lower end of said bearing block and an annular bearing disk fitting into said skirt, said block and said disk having each a keying means for coaction with the corresponding axle and knuckle members in the assembled construction.

7. In a motor vehicle, in combination, an axle, a knuckle having a pivot mount with respect thereto, one of said members having a clevis, a thrust bearing between one of the jaws of said clevis and the other member, said thrust bearing including a thrust disk keyed to the knuckle and a coating thrust block keyed with respect to the axle, means for conveying lubricant from the axle to the pivoted knuckle, said means comprising a lubricant inlet fitting in the thrust block, a passageway from said fitting through parts rigid with said block delivering to the thrust bearing surface of said block and registering with a port in the bearing disk, said port delivering in turn into a bore in the corresponding face of the knuckle, and a conduit carried by the knuckle supplied by said bore and leading to a knuckle bearing.

8. In a motor vehicle, in combination, an axle, a king pin extending through an eye thereof and pinned thereinto, a knuckle having clevis jaws with bushings therein about the ends of the king pin, a thrust bearing interposed between the lower clevis jaw and the corresponding surface of the axle eye, said thrust bearing including a bearing plate keyed to the knuckle and a bearing block coacting therewith and keyed to the axle, a lubricant inlet fitting secured in said bearing block and delivering into a bore longitudinally of and extending through the top of the king pin, and a pipe in flow intercepting relationship with the upper bushing of the king pin and extending generally downward along the structure of the knuckle to a bearing thereof.

9. In a steering axle of the type including a beam, a knuckle coacting with the end thereof, one of said members having a clevis straddling the other, a king pin rigid with the straddled member and affording a bearing surface at the ends thereof for the knuckle member, the clevis jaws being spaced by a distance materially greater than the interposed length of the straddled member to afford room for a thrust bearing; the combination therewith of a thrust bearing including a plate rigid with the knuckle, a block rigid with the axle, the upper of said plate and block having an annular lip encircling the lower to render the construction substantially dust-tight, a lubricant inlet fitting affixed in the lateral face of said block, a passageway in structure rigid with said axle terminating near the upper end of the knuckle and a conduit carried by the knuckle leading to one of the bearings thereof, and in flow intercepting relationship with the upper end of said passageway, a vertical bore through said block, and a conduit rigid with said knuckle draining lubricant from said bore and leading to one of the bearings carried thereby.

10. In a motor vehicle, in combination, a knuckle, an axle, one of said members having a clevis straddling the other, and a king pin providing a pivot mount for said knuckle, a thrust bearing block interposed between the lower clevis jaw and the straddled member, a plug closing the lower end of said clevis jaw to prevent loss of lubricant therefrom, a lubricant inlet in said block, a duct in said block extending across the thrust bearing surface, a longitudinal bore through said clevis jaw supplied from said duct, a port delivering from said bore to the lower king pin bearing, a fitting communicating laterally with said bore at a part substantially above the lower end of said king pin and a pipe connecting said fitting with one of the bearings of the knuckle.

11. In a motor vehicle, in combination, an axle, a king pin fixed in the end thereof, a knuckle having a clevis bearing about the ends of said king pin, a thrust bearing interposed between the lower clevis jaw and the axle, said thrust bearing including a block keyed to the axle, said knuckle having rigid therewith a pair of bearings, means for supplying lubricant to said bearings, comprising inlet means affixed in the lateral face of the bearing block, a passage through said block and longitudinally through the king pin for delivering lubricant through the upper end of the latter, a lubricant-intercepting pipe carried by the knuckle and delivering lubricant from the king pin downward by gravity flow to one of the bearings, a passage supplied from said lubricant inlet means extending downward along the knuckle to deliver to the other bearing, and check valve means to prevent return flow of lubricant from the upwardly extending king pin bore, thereby precluding the draining to the lower bearing of lubricant intended for the upper bearing.

12. In a motor vehicle, in combination, an axle beam, a king pin rigid therewith, a knuckle having a clevis bearing on the ends of said king pin, said knuckle having a drag link and a tie rod bearing rigid therewith, a thrust bearing interposed between the lower clevis jaw and the axle, said thrust bearing comprising a plate rigid with the knuckle, a coacting block rigid with the axle, a lubricant inlet fitting carried by said block and delivering into a radial bore through said block in turn communicating with a corresponding radial bore in said king pin, a gasket at the joint between said bores, an axial bore in said king pin extending upward from the radial bore thereof, a lubricant pipe carried by the knuckle and in flow intercepting relation with lubricant through said king pin, said pipe extending along structure of said knuckle to the drag link bearing, a second bore through said thrust block delivering to the bearing surface thereof, an annular groove in the bearing face of the thrust bearing, a draining passage therefor extending along the structure of said knuckle to deliver to the tie rod bearing, and means controlling the distribution of lubricant from said inlet between said king pin bore and said draining passage.

13. In a motor vehicle, in combination, an axle, a steering knuckle having a pivot mount thereon and including bearings rigid therewith, means for lubricating said bearings from a single source, said means comprising an inlet fitting rigid with the axle and below the upper part of the knuckle pivot thereof, passageways supplied from said inlet fitting, one extending upward through structure fixed with respect to the axle, a conduit system on the knuckle intercepting lubricant from said passageway and delivering it to one of the bearings, a second passageway supplied from said inlet fitting and extending generally downward therefrom and a restriction pin near the inlet to said second passageway to restrict the flow of lubricant therethrough said first passageway being substantially open from end to end.

14. The combination set forth in claim 13 in which a spring-seated check valve prevents the draining of the upwardly extending passageway.

15. In a motor vehicle, in combination, an axle, a king pin rigid therewith, a knuckle having a clevis straddling said axle and bearing on said king pin, a thrust bearing interposed between the lower clevis jaw and the axle, said thrust bearing including a disk keyed with respect to the clevis and a block keyed with respect to the axle, a lubricant inlet fitting affixed in said block communicating with a radial passage through said block in turn communicating with an axial passage in said king pin extending upward therefrom, a pipe carried by said knuckle, and draining lubricant delivered through the upper end of the king pin to one of the bearings of the knuckle, said thrust block having a lateral passage supplied from the radial passage, a drain passage through said thrust block, means at the bearing face of said thrust bearing intercepting lubricant from said drain passage, and a conduit along the structure of the knuckle supplied from said means and leading to the other knuckle bearing.

16. The combination set forth in claim 15 in which a restriction pin in the lateral passage controls the distribution of the lubricant between the two bearings and in which a spring seated relief valve in the king pin prevents the draining of the axial passage through the latter.

17. In a motor vehicle, in combination, an axle, a steering knuckle pivoted thereto, a thrust bearing sustaining the axle on the knuckle and spacing said members apart, and a lubricant inlet fitting fixed with respect to the axle and between the planes defining the thickness of the thrust bearing member, and a conduit system carried by said knuckle and in flow intercepting relationship with respect to lubricant from said inlet fitting and leading to one or more of the knuckle bearings.

18. In a motor vehicle, in combination, an axle, a king pin fixed therein, a knuckle having a clevis with jaws straddling said axle and bearing about the ends of said king pin, means closing the lower bearing of the king pin to prevent loss of lubricant therefrom, a longitudinal bore substantially through the length of the lower clevis jaw and parallel to the king pin and closed at its lower end, a port delivering from said bore to the lower king pin bearing, and a conduit communicating laterally with said bore at a part thereof substantially above the lower end of said king pin, and connected with one of the bearings of the knuckle.

19. In a motor vehicle in combination, an axle, a steering knuckle pivoted thereto, a lubricant inlet member, a sustaining element for the latter disposed adjacent the knuckle pivoted axis and lodged in a space between the knuckle and the axle and held against movement relative to the latter.

20. In a steering axle of the type including an axle beam, a king pin extending through an eye thereof, a knuckle having clevis jaws bearing on the protruding ends of the king pin, a thrust bearing interposed between the lower clevis jaw and the corresponding surface of the axle eye, said thrust bearing including a bearing plate having a hollow pin keying the latter to the knuckle clevis therebelow, means substantially fixed with respect to the axle for admitting lubricant to the thrust bearing and means draining lubricant from said thrust bearing through said hollow pin into the pivot bearing of the lower clevis jaw.

Signed at New York in the county of New York and State of New York this 20th day of August, A. D. 1925.

THOMAS R. THOMAS.